(12) United States Patent
Kremerman

(10) Patent No.: US 9,895,626 B2
(45) Date of Patent: Feb. 20, 2018

(54) EQUAL TEMPERATURE DISTILLATION CHAMBER AND METHOD

(71) Applicant: Elliot Kremerman, Scotts Valley, CA (US)

(72) Inventor: Elliot Kremerman, Scotts Valley, CA (US)

( * ) Notice: Subject to any disclaimer, the term of this patent is extended or adjusted under 35 U.S.C. 154(b) by 0 days.

(21) Appl. No.: 15/668,177

(22) Filed: Aug. 3, 2017

(65) Prior Publication Data

US 2017/0340988 A1    Nov. 30, 2017

(51) Int. Cl.
*B01D 3/32*  (2006.01)
*B01D 5/00*  (2006.01)
*B01J 19/30*  (2006.01)

(52) U.S. Cl.
CPC .............. *B01D 3/32* (2013.01); *B01D 5/006* (2013.01); *B01J 19/30* (2013.01)

(58) Field of Classification Search
CPC ............. B01D 3/32; B01D 5/006; B01J 19/30
See application file for complete search history.

(56) References Cited

U.S. PATENT DOCUMENTS

| | | | |
|---|---|---|---|
| D936,467 | | 10/1909 | Maurer |
| 1,418,691 A | * | 6/1922 | Anders ..................... B01D 3/00 422/531 |
| 2,383,377 A | | 8/1945 | Evans |
| 2,468,872 A | * | 5/1949 | Goldsbarry .......... B01D 3/4205 202/185.1 |
| 2,535,856 A | | 12/1950 | Luertzing |
| 2,582,969 A | | 1/1955 | Dinsmore |
| 2,701,789 A | | 2/1955 | White |
| 3,240,682 A | * | 3/1966 | Irving ..................... G01N 25/14 202/158 |
| 3,334,025 A | * | 8/1967 | Reid ........................ B01D 3/00 202/161 |
| 3,334,966 A | * | 8/1967 | Shepherd .................. C01B 6/10 423/294 |
| 3,607,662 A | * | 9/1971 | Glover ..................... B01D 3/14 202/160 |
| 3,812,010 A | * | 5/1974 | Nitsch ....................... C13K 3/00 127/41 |
| 4,065,261 A | | 12/1977 | Fukada |
| D248,133 S | | 6/1978 | Shames |
| D248,134 S | | 6/1978 | Shames |
| 4,316,294 A | | 2/1982 | Baldwin |
| 4,346,059 A | | 8/1982 | Spector |
| 4,349,042 A | | 9/1982 | Shimizu |

(Continued)

*Primary Examiner* — Jonathan Miller
(74) *Attorney, Agent, or Firm* — Michael J. Feigin, Esq.; Feigin and Fridman

(57) ABSTRACT

An equal temperature fractional distillation chamber allows for more precise distillation by providing solid particulate matter with air spaces, such as Raschig rings, to radiate heat from the bottom of the chamber to an area where the vapors are separated. This area is unencumbered by Raschig rings or other devices and can be reduced in size, as necessary, to be less than 20% or 10% of the vertical height of the chamber. Further, a distillation key can enter from the top of the chamber and come down into the chamber with rings which encourage condensation of vapors which rise upwards. In this manner, a very controlled and accurate distillation can be achieved due to the higher heat capacity of the glass or other materials around the unencumbered region.

20 Claims, 10 Drawing Sheets

(56) References Cited

U.S. PATENT DOCUMENTS

| | | | |
|---|---|---|---|
| 4,370,543 A | | 1/1983 | Nemeth |
| 4,597,404 A | | 7/1986 | Van Marcke |
| 4,765,003 A | | 8/1988 | Chang |
| 4,770,746 A | | 9/1988 | Mayo |
| 5,164,049 A | * | 11/1992 | Clark .................. B01D 1/02 134/12 |
| 5,354,428 A | * | 10/1994 | Clark .................. B01D 1/02 159/DIG. 19 |
| D364,917 S | | 12/1995 | Wolf |
| D392,371 S | | 3/1998 | Holcombe |
| D402,355 S | | 12/1998 | Bahar |
| D409,736 S | | 5/1999 | Koehn |
| D463,851 S | | 10/2002 | Eastman |
| D469,167 S | | 1/2003 | Eastman |
| D550,819 S | | 9/2007 | Seehoff |
| D597,181 S | | 7/2009 | Jones |
| D604,809 S | | 11/2009 | Mannella |
| D673,247 S | | 12/2012 | Eylon |
| D680,628 S | | 4/2013 | Houck |
| D683,436 S | | 5/2013 | Feliciano |
| D695,066 S | | 12/2013 | Nakajima |
| D728,078 S | | 4/2015 | Scott |
| D730,493 S | | 5/2015 | Sehl |
| 9,682,331 B2 | * | 6/2017 | Kremerman ............ B01D 3/10 |

* cited by examiner

EQUAL TEMPERATURE DISTILLATION CHAMBER AND METHOD

FIELD OF THE DISCLOSED TECHNOLOGY

The disclosed technology relates generally to distillation and, more specifically, to a distillation chamber with consistent temperature during distillation.

BACKGROUND OF THE DISCLOSED TECHNOLOGY

Distillation or fractional distillation is carried out by heating a solid or liquid and removing gaseous vapors that are expelled therefrom. This can be done while raising the temperature, as each compound boils at a different temperature. However, when working with small amounts of starting raw material or items which have close boiling points, this can be difficult, as multiple compounds get removed simultaneously. Further, a problem can arise when the temperature throughout the distillation equipment is not constant, and some of the vapor re-condenses before being evacuated from a distillation chamber.

Thus, there is a need to find a way to distill with greater efficiency and separation of compounds, while preventing vapors from re-condensing back into the product being distilled.

SUMMARY OF THE DISCLOSED TECHNOLOGY

A distillation head is a unit used to conduct fractional distillation of a solid, removing impurities therefrom by boiling off parts based on their boiling temperature. Each portion having a different boiling temperature relative to the other portions is a fraction. Such a distillation head of embodiments of the disclosed technology has a vertically extending inner chamber extending between a lower port and an upper port (on opposite sides to each other) with a pinched inner region (a region have a smaller international and unencumbered area by at least 20%, 40%, 50%, or 75% than the rest of an inner chamber of the distillation head) in a lower section thereof. The lower section is defined as a lowest 25% or 20% of the distillation head or a portion which is below an airtight air-filled jacket or thinner at it's exterior side than a section there-above. A plurality of Raschig rings are situated and supported by the pinched inner region of the vertically extending inner chamber. Raschig rings are inert rings procured, for example, of glass or metal which have portals extending there-through and generally fit at least three, five, or six horizontally across the vertically extending inner chamber (e.g. across a circumference of a narrow side or side which is perpendicular to the most elongated side). A hollow portion of the vertically extending inner chamber is between the Raschig rings and a side portal. This portion is unencumbered, meaning that there is free air flow and in this section has a cross sections (sections perpendicular to the most elongated length of the distillation head) which within the inner chamber are entirely hollow. The side portal connecting the hollow portion of the vertically extending inner chamber with a hollow portion of a discharge chamber.

A distillation key extends within the upper portal of the vertically extending inner chamber towards said Raschig rings in some embodiments of the disclosed technology. The key is equi-spaced from side walls of the vertically extending inner chamber in embodiments, the side walls being walls extending between the upper portal and the lower portal, and generally or exactly perpendicular thereto, of the vertically extending inner chamber.

A portion of the vertically extending inner chamber is unencumbered by either the distillation key and the Raschig rings and (the airspace or space between the rings, key, and side walls) is heated by a heat source below the bottom portal and is of substantially equal temperature to the Raschig rings in embodiments of the disclosed technology. This portion or unencumbered portion can be less than 35%, 25%, 20%, or 10% of the vertical height of the distillation head (calibrated for the solid or liquid being fractionally distilled) in order to achieve equal or substantially equal temperature between the distillation key and bottom portal. The unencumbered portion can be within a mid-region of the vertically extending inner chamber which is either between 40% and 60% of the distance between bottom and top of the chamber, or above a lowest extent of a vacuum chamber and below a side portal entering into the the chamber.

It should be understood that "top", "bottom", and "sides" are relative to the direction of typical usage with the bottom being a load flask port and a top being where the distillation key enters, in some embodiments of the disclosed technology. The "vertical" direction is between the "top" and "bottom" and is the most elongated direction of the distillation head, in embodiments of the disclosed technology.

Referring now to the jacket, this jacket is an airtight and sealed region which is enclosed by glass or other inert material which makes up the distillation head, in embodiments of the disclosed technology. This jacket, in embodiments, is a double-layer jacked with two spaced apart layers and a portal extending between the two layers, the portal extending transverse (opens horizontally) to the vertically extending inner chamber.

The vertically extending inner chamber and the pinched inner region are formed together as one continuous and uninterrupted unit of inert glass material in embodiments of the disclosed technology. Using this device, one can melt a solid such that it's vapors extend upwards from the bottom portal, between the Raschig rings, and at least partially out of the side portal. The vapors, when between the bottom portal and the unencumbered portion of the vertically extending chamber are of substantially the same temperature at some times when using the disclosed technology, which has been found to not be the case in the prior art distillation units. The temperature, when it is the same, is elevated from the ambient room or air temperature surrounding the jacket, such as near the boiling point of water or at least 30 or 50 degrees Celsius over the ambient temperature.

Said another way, a fractional distillation device has an unencumbered mid-region of a vertical chamber, and a plurality of Raschig rings extending from the unencumbered mid-region to a narrowest (horizontal) section of the vertical chamber. The vertical chamber, in this embodiment, has a bottom portal below the narrowest region, a top portal on a side opposite the bottom portal, and a side portal opening into the vertical chamber above said unencumbered region.

This fractional distillation device can have an upper region with a key which passes there-through, the key centered horizontally (perpendicular to the vertical most length of the vertical chamber) which extends downwards into the vertical chamber and has a plurality of condensation rings on which vapors condense. The "upper region" is defined as between the top portal and a lowest extent of the key, in embodiments of the disclosed technology.

A double layered airtight jacket extends, in embodiments of the disclosed technology, around at least a majority of the upper region and the entirety of the unencumbered mid-region of the vertical chamber, the mid-region being, in this case, the region which is unencumbered and between the key and Raschig rings. A portal between each layer of the double layered airtight jacket is in some embodiments, which serves to equalize pressure and stress on the entirety of the jacket.

This fractional distillation device of claim can be calibrated such that heated vapors extend from beneath the device into the vertical chamber through the bottom portal and at least partially out of the side portal with a constant temperature or substantially constant temperature to be reached, over time, between the bottom portal and the unencumbered mid-region. This can also include the unencumbered region itself being at the same temperature.

In a method of fractional distillation, one can use devices of the disclosed technology as follows, the order being variable so long as heating takes place after the steps of setting up the device for use. Raschig rings are placed in a vertical chamber of a fractional distillation device above, and supported by, a narrow section of glass which extends inward from otherwise vertical walls of the fractional distillation device. One can then continue to place Raschig rings into the vertical chamber until the Raschig rings reach at least a height of an airtight jacket. A solid (or liquid or combination of both) can then be heated beneath the vertical chamber causing at least some vapors from the solid to pass through and above the Raschig rings and exit through a side portal of the vertical chamber, the side portal being above the Raschig rings. As such, a temperature of the vapors passing through the Raschig rings as well as between the Raschig rings and the side portals are of substantially the same temperature in embodiments of the disclosed technology.

The airtight jacket is double layered in some embodiments. A portal extends between each layer of the double layered airtight jacket in some embodiments. Before heating, in some embodiments a distillation key is placed into an upper portal of the vertical chamber such that the distillation key extends a majority of a distance between the upper portal and an upper extent of the Raschig rings.

A same temperature extends to a bottom most extent of the distillation key, after the step of heating in some embodiments.

Any device or step to a method described in this disclosure can comprise, or consist of, that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

Figure 1:
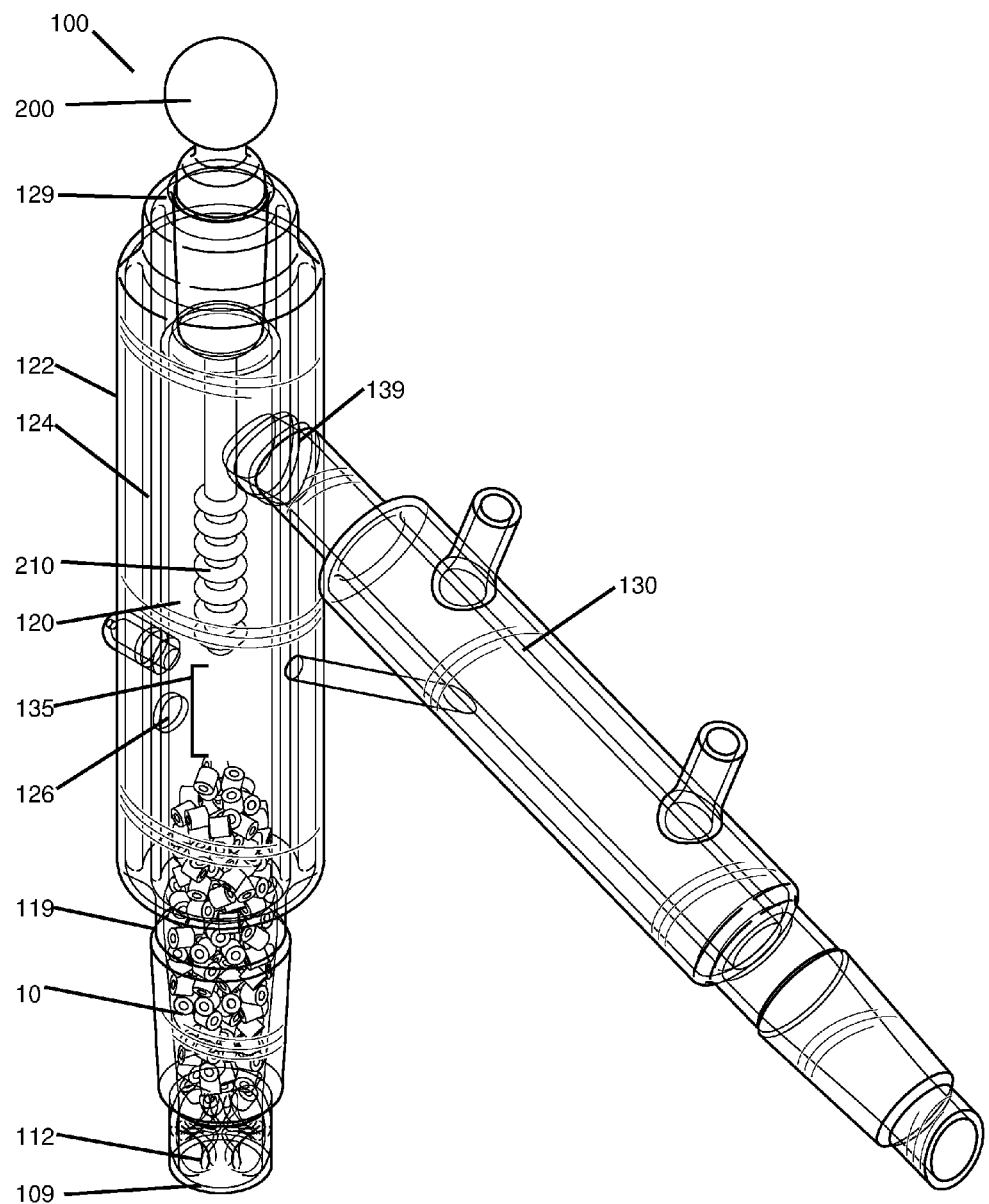
FIG. 1 shows a perspective view of a distillation head with key and Raschig rings used in embodiments of the disclosed technology.

A standard distillation head tends to have a temperature gradient extending from a bottom to the a top thereof, as the heat source is beneath the distillation head and the distillate is a gas rising up from the bottom. Using an infrared camera, differences in heat were measured on a single jacket (single gas insulated layer) distillation head. A noticeable distance along the side the surface was dispersing heat. A very hot section was found in the middle (substantially or exactly 40% to 60% of the distance from the bottom port to the top port) of a main vertical elongated channel of the head. Both the top and bottom had an extended head gradient away from the center, each being cooler than the center.

As such, one can summarize that during (fractional) distillation, the lowest section has the bulk of temperature loss to the surroundings. This would be expected to be the hottest region as it is most near the heat source, but in practice, condensate sits in the lower area (defined as "lowest ⅓ or ¼" of the vertical elongated chamber") causing vapors that pass through this section and become more cooled.

Based on the above tests, and Newton's law of cooling, it has been found that a maximum amount of heat is reached, compared to the input temperature, in any distillation head. The head is exposed to the atmosphere creating a thermal conductive effect from the glass to the air, and even more so if the air is flowing at high speeds such as when using a ventilated fume hood. The core, a central hollow region where vapors pass through, thus also has a maximum temperature with little change based on the input temperature.

In embodiments of the disclosed technology, two vacuum jackets or layers of jackets are used, each with one of a vacuum, atmospheric air, an inert gas, or a combination thereof. Material packing is used in the distillation head and extends from a lower port (a port at a bottom of the device/a port designed or adapted to be placed atop a reaction which releases gas) into a portion of the vertical distillation chamber (a hollow chamber extending from the lower port to an upper port. The packing extends, in embodiments, at least partially between the lower port and a discharge port (side port opening into the vertical chamber) and/or to beneath a distillation key placed within the vertical chamber. The packing is placed substantially from the load flask port/lower port to one of the bottom of the distillation key or discharge port, where substantially in this case is defined as leaving less than 20%, 10%, or 5% of the space between the lower port and the distillation key or discharge port. This allows the retention of heat in the vertical chamber where the material is packed, with a near equal temperature achieved, in embodiments of the disclosed technology, in a lower and middle region of the vertical chamber while still allowing the vapors to pass through and be distilled from the bottom or load port to the discharge port.

For purposes of this disclosure, material packing is synonymous with "Raschig rings" and are defined as inert packing material which stays structurally intact through changes in temperature and passage of vapors there-around during fractional distillation. Such material packing can have portals passing through each individual piece.

Using infrared cameras on the portion of the vertical chamber with the packing, no significant temperature gradient was found once the temperature of the packing near the top matches that of the packing most at the bottom. This allows the entire surface to be the same in temperature from bottom to top to prevent inefficiencies during distillation.

In order to accommodate the packing material, inner glass joints forming a pinched region of a distillation head are added just beneath (touching/supporting) the material packing. The packing transfers and maintains heat such that the area within the main boiling flask where the highest energized molecules are traveling at their highest rate of energy. This prevents heat loss and temperature gradients found in the prior art allowing for both faster distillation and more accurate fractions to be boiled off, one by one with smaller ranges of temperature of each fraction. It is further common, in the prior art, with distillation techniques to repeat distillation multiple times to increase the purity of each fraction. The present technology prevents and eliminates the need for much of the repeated distillation and the efficiency is a major improvement over the prior art.

Using an infrared camera, it was visually noted that the support section with material packing had no detectable temperature gradient. This was tested with distillation of (seperately) organic plant oleoresin, palm oil extract, and contaminated cooking oil. The process used in preparation of tested solutions is as follows. All material to be distilled was dissolved in one of hexane, pentane, ethanol, isopropanol or methanol. Each had varying results in mechanical separations prior to distillation, and numerous steps can be applied with different solvents to have a cross effect when each step is done and repeated with a different solvent.

All solutions were passed through several filtration papers by micron size and varied temperatures from room temperature up to 120-140 Fahrenheit. Carbon filtration was used with a natural silica bed filtration with a estimated load rate of 3.5-10%, as well as natural earth bleaching clays of 3.5-20% ratio to material that is saturated with desired solvent. Differently ionic charged mineral content determined what ionic silicas had the most success removing water soluble compounds that were unwanted and targeted in removal prior to distillation. Then the solutions were treated in several different fashions so that all solvent was removed from the solutions to leave a dried oil like tar that was generally very solid at room temperature.

A heated oven with a slight sweeping gas was used above 200 degrees Celsius to remove moisture and activate the ionic charge while removing water and other gaseous molecules trapped. Sometimes mineral clays were used in the baking process first, then using a mortar and pestle, the clay was reduced to a finer power. Coconut husk or non acidic carbon chunks were dried in a oven in some tests. Clay was dried in the oven as well, then pulverized and the powdered clay was applied to the fresh hot carbon chunks. Then reinserted back into the oven to further activate material.

A resin solution was brought to temperature approx 140 Celsius. The media activating in the oven would have the temperature reduced and immediately removed from the heated oven and placed in the hot prepared resin solution. This process was done to avoid the most amount of water or unwanted molecules from attracting to the resin or media surface that would change the aggressive ionic bonds from activation. Air and moisture in the air is attracted to both surfaces if let cool and activation efficiency is reduced greatly.

This process causes a severe amount of dust to be present. This will in turn risk contamination through a basic head, and any head without thermally sensitive cores will condense and overly saturate the core due to the inherently contaminated solution present in the prior art.

The present technology uses the material packing, as described above and below, and adequate temperature retention within the head shows a significant increase in accuracy (boiling point variation in each fraction distilled/lack of temperature gradient while distilling) compared to traditional ways the internal mechanics of a head operate. During the time heat is increased and vacuum is reduced the material packing creates a high surface area for condensation to occur. The specific location actually showed a visual ability of the core to reject condensate rapidly (cause the condensate to re-vaporize). Typically, as the core of the packed area reduced in temperature the condensate lingers within the distillation head even as consistent higher difference in core temperature resulted. In the prior art, one might try and then better insulate the head by wrapping material there-around or by raising the temperature, but this has little effect whereas the packing material has been found to prevent the build up of condensate which would otherwise decrease effectiveness of the distillation. The reason for this effect is because the temperatures are much hotter and consistent in the inner region of the distillation head.

Further, use of a key extending into the vertical distillation chamber which further serves to condense vapors there-on and more accurately maintain temperature in a mid-region where the vapors are being fractionally distilled at each temperature selected, it was noticeable that the vapors were darker in nature while the output extending out the side chamber and being expelled from the distillation head was nearly non-pigmented oil. In some cases, visually 99.5% of all noticeable color removal was achieved with clarity similar to pure water or mineral oil.

Figure 2:
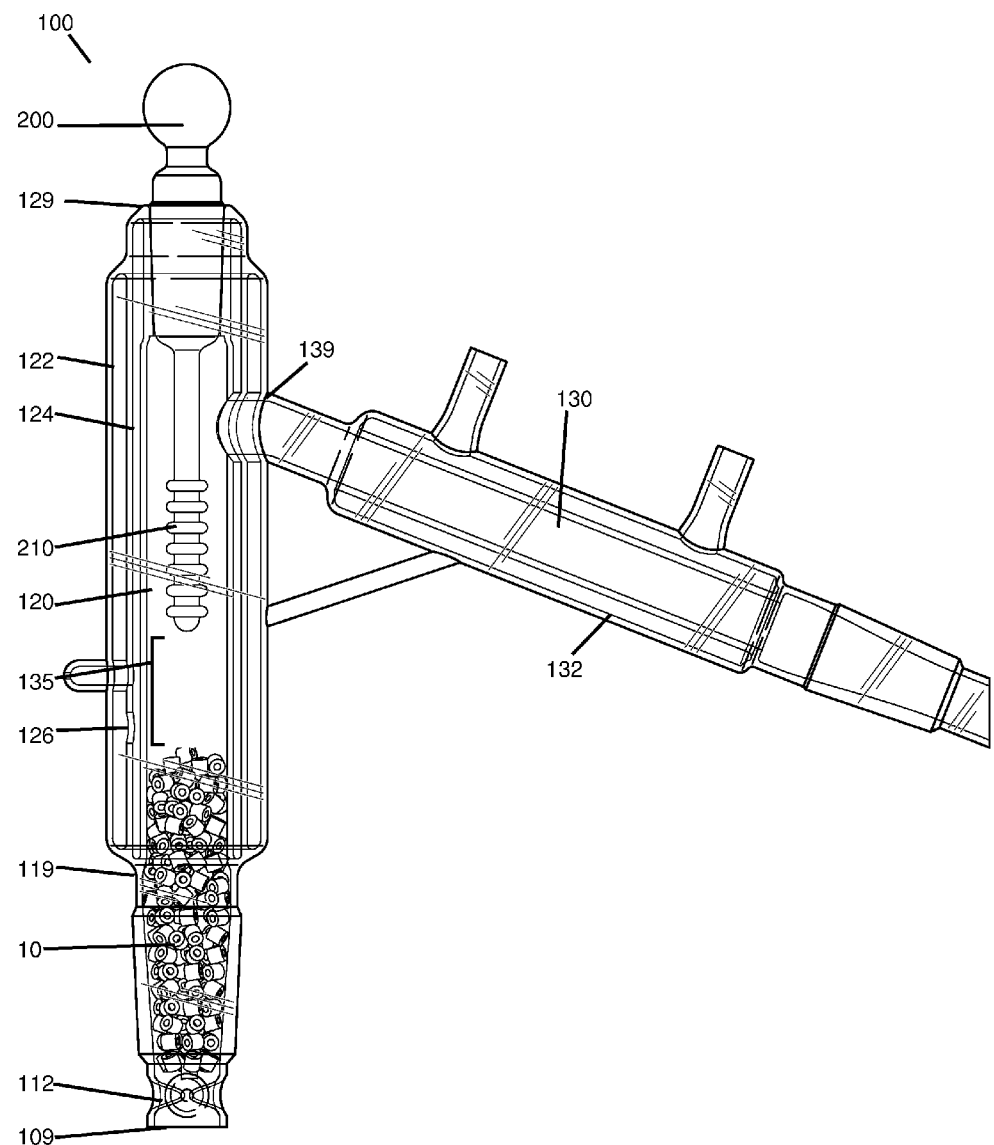
FIG. 2 shows a side elevation view of the distillation head of FIG. 1.
Figure 3:
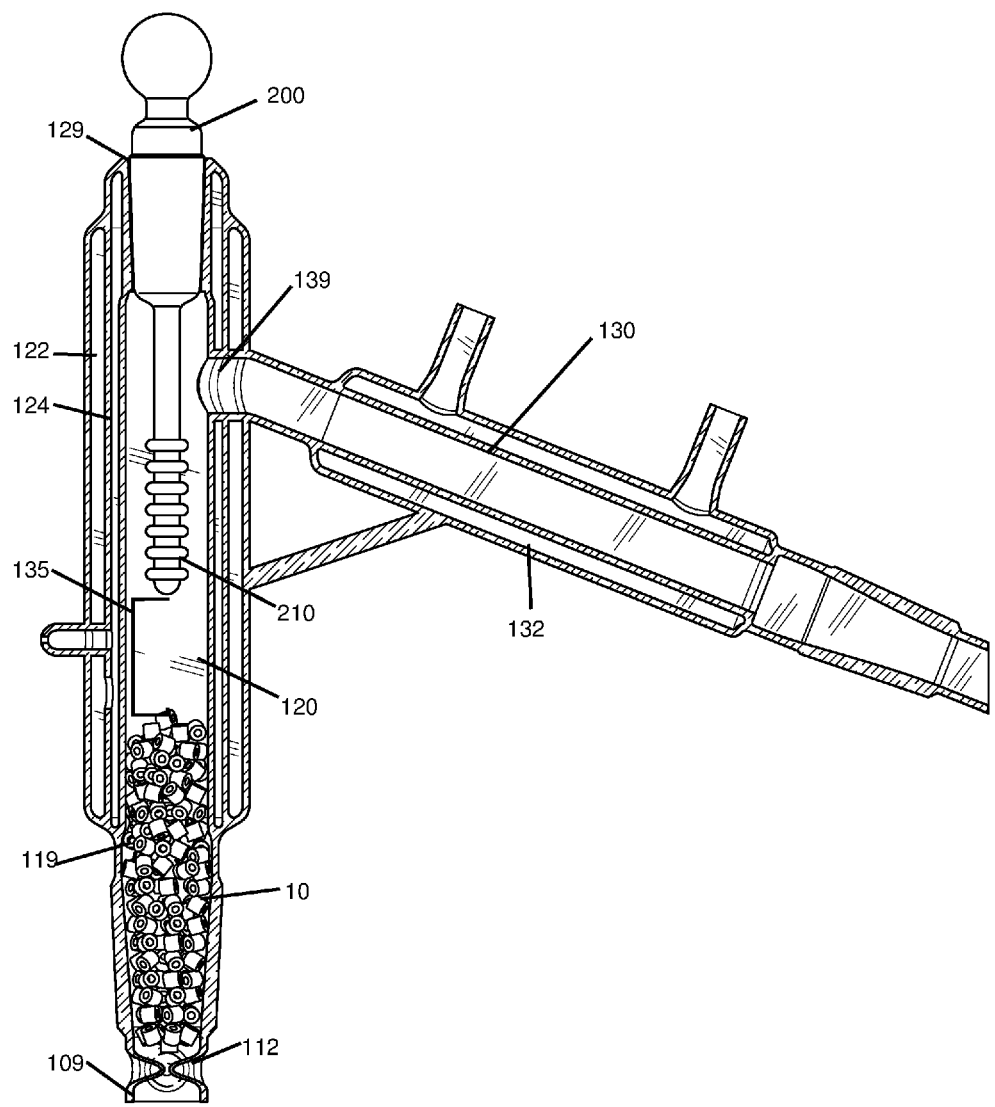
FIG. 3 shows a side sectional view of the distillation head of FIG. 2.
Figure 4:
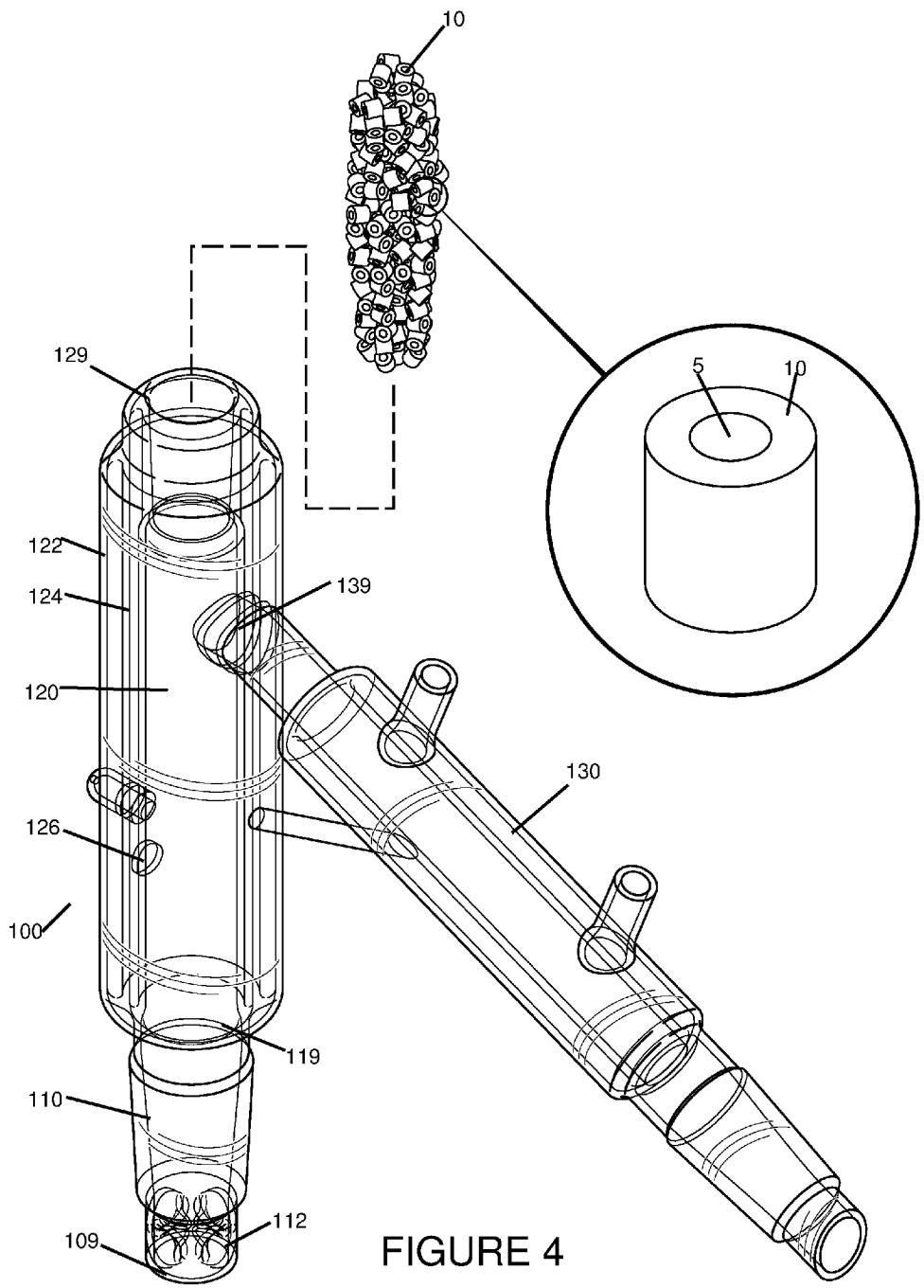
FIG. 4 shows the perspective view of the distillation head of FIG. 1 with placement of the Raschig rings into an empty distillation head.
Figure 5:
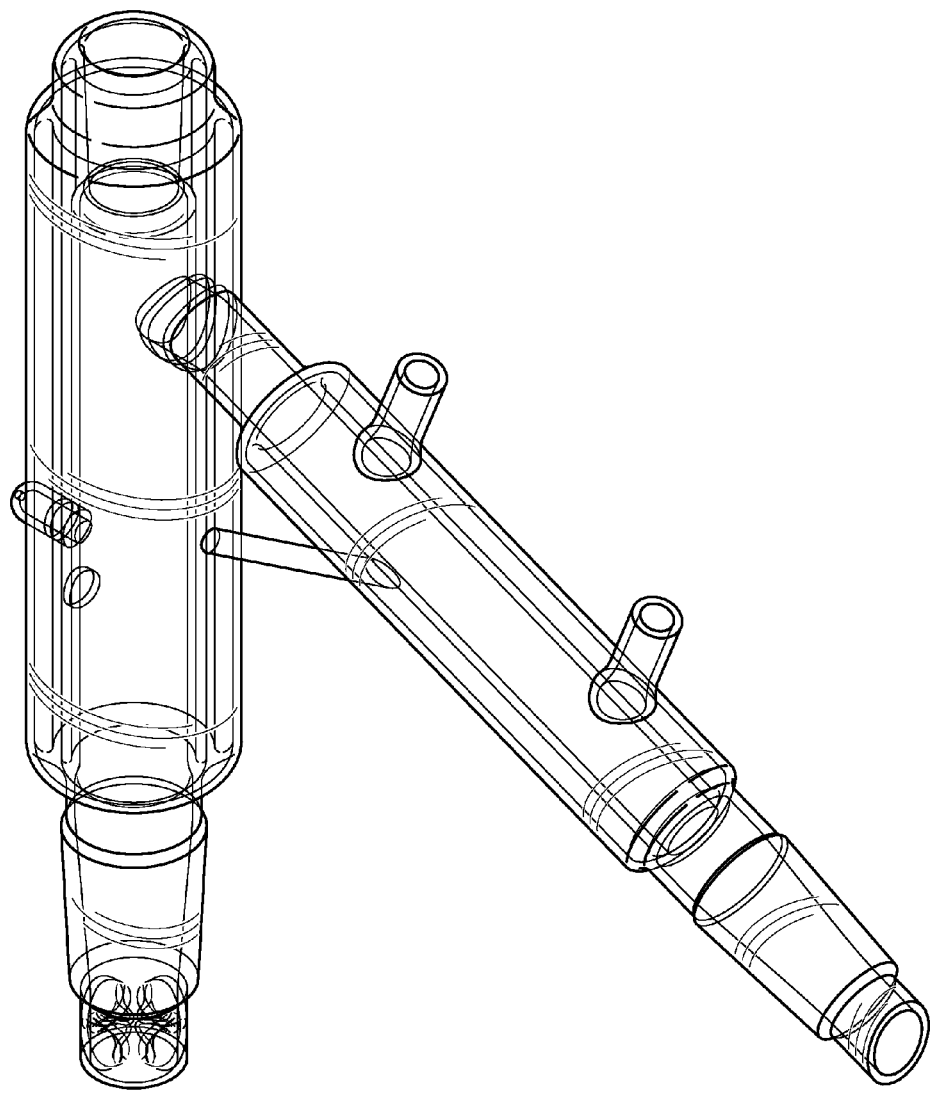
FIG. 5 shows the distillation head of FIG. 4 without additional parts.
Figure 6:
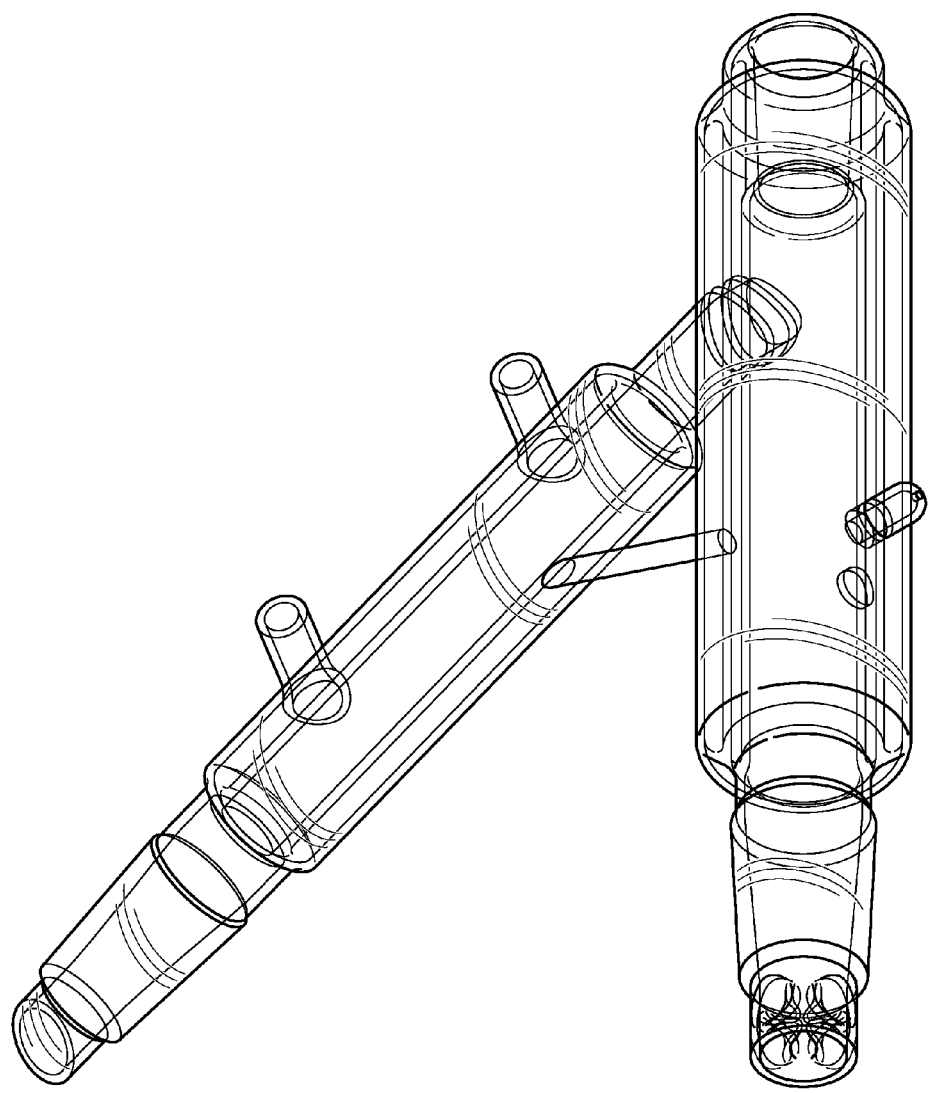
FIG. 6 shows a reverse perspective view of the distillation head of FIG. 5.
Figure 7:
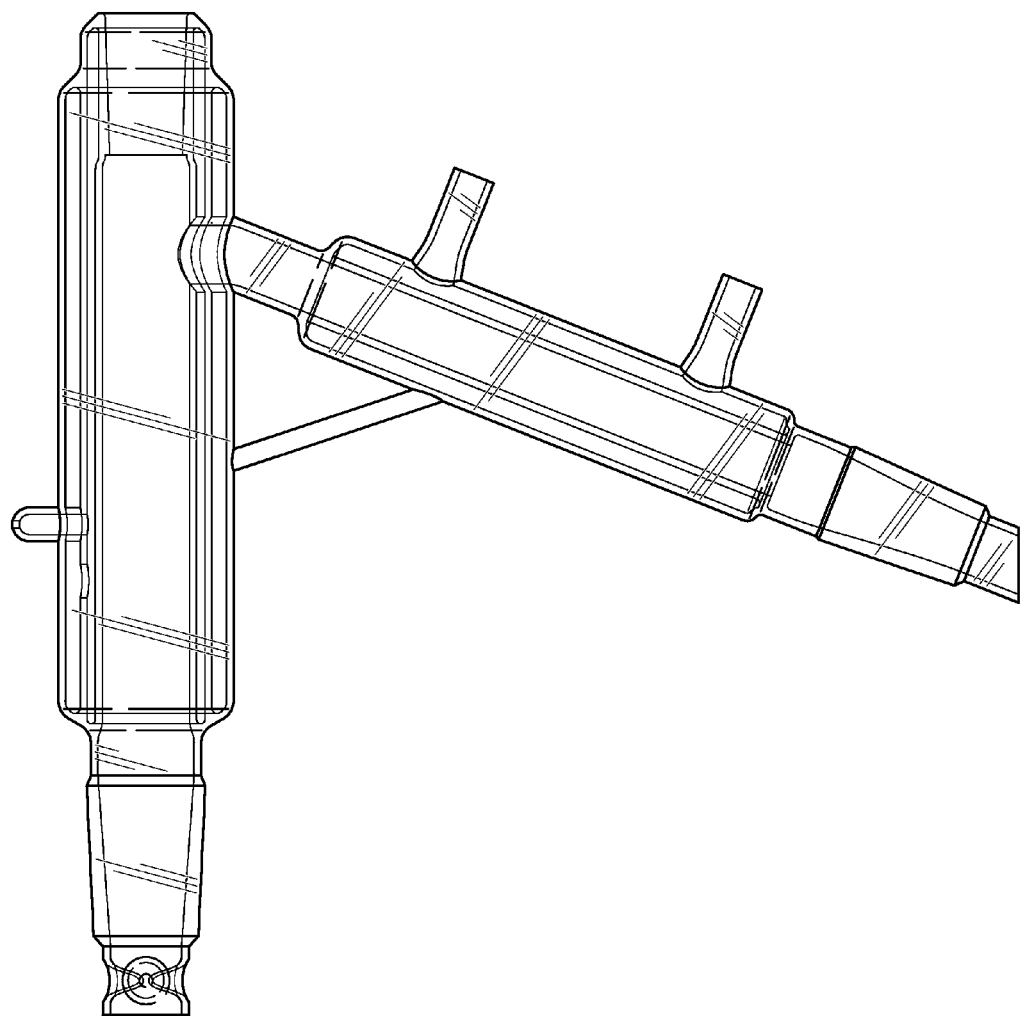
FIG. 7 shows a reverse side elevation view of the distillation head of FIG. 5.
Figure 8:
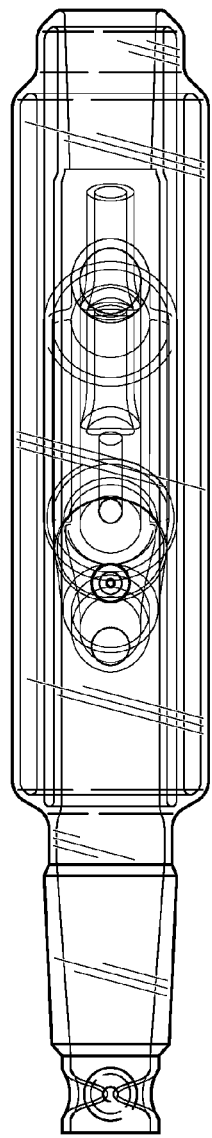
FIG. 8 shows a narrow side elevation view of the distillation head of FIG. 5.
Figure 9:
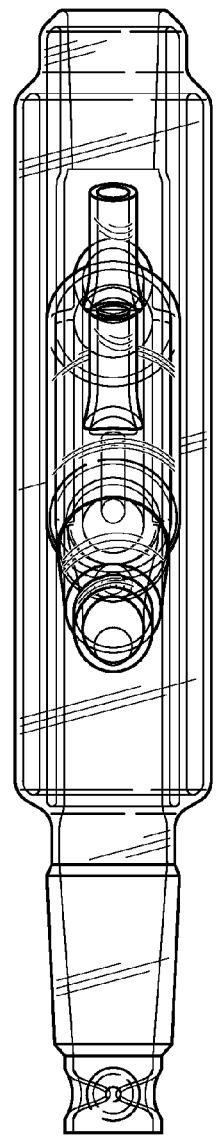
FIG. 9 shows a reverse narrow side elevation view of the distillation head of FIG. 5.
Figure 10:
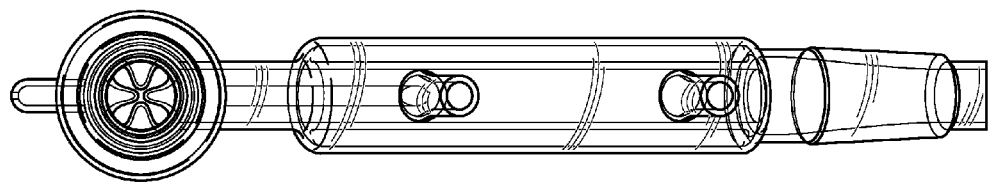
FIG. 10 shows a top plan view of the distillation head of FIG. 5.
Figure 11:
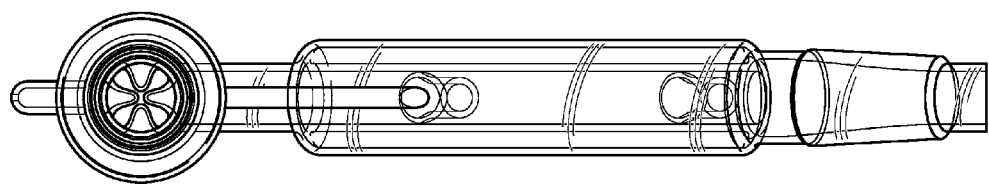
FIG. 11 shows a bottom plan view of the distillation head of FIG. 5.
Figure 12:
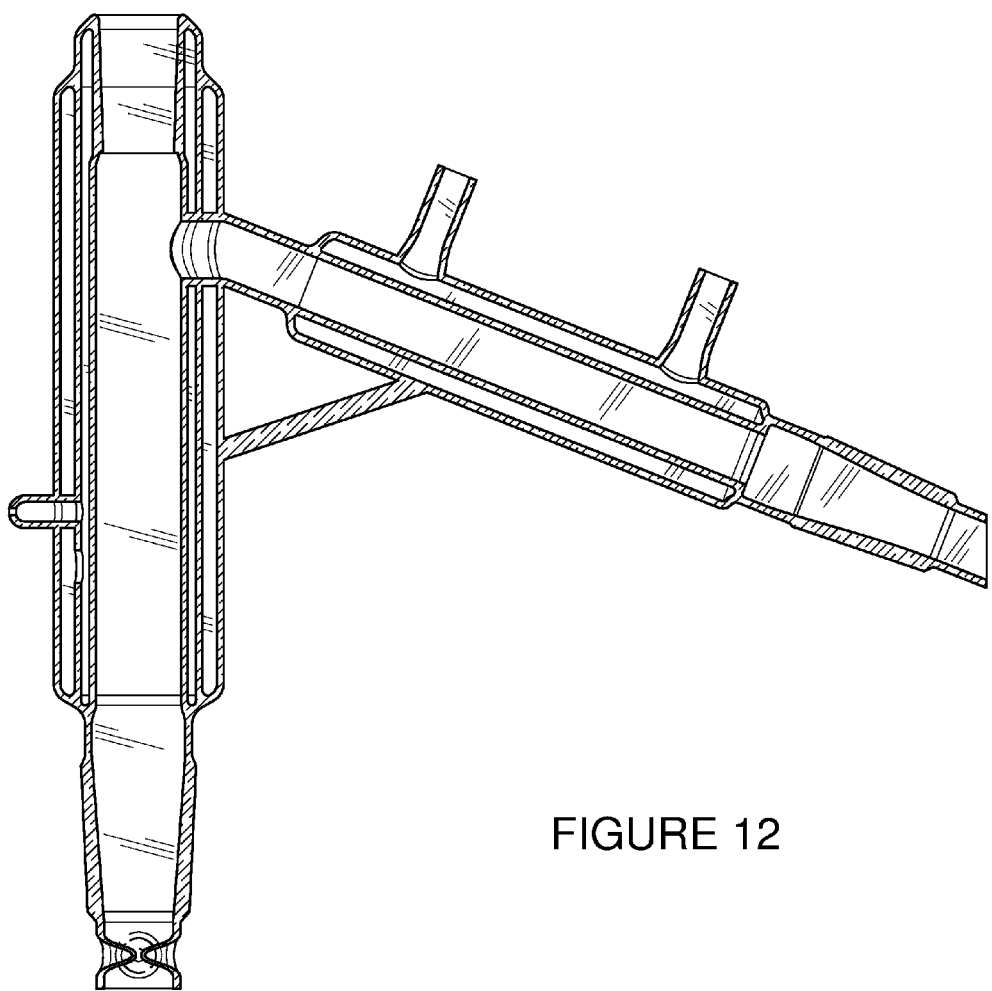
FIG. 12 shows a sectional elevation view of the distillation head of FIG. 5.

Now discussing the Figures together, FIG. 1 shows a perspective view of a distillation head with key and Raschig rings used in embodiments of the disclosed technology. FIG. 2 shows a side elevation view of the distillation head of FIG. 1. FIG. 3 shows a side sectional view of the distillation head of FIG. 2. FIG. 4 shows the perspective view of the distillation head of FIG. 1 with placement of the Raschig rings into an empty distillation head. FIG. 5 shows the distillation head of FIG. 4 without additional parts. FIG. 6 shows a reverse perspective view of the distillation head of FIG. 5. FIG. 7 shows a reverse side elevation view of the distillation head of FIG. 5. FIG. 8 shows a narrow side elevation view of the distillation head of FIG. 5. FIG. 9 shows a reverse narrow side elevation view of the distillation head of FIG. 5. FIG. 10 shows a top plan view of the distillation head of FIG. 5. FIG. 11 shows a bottom plan view of the distillation head of FIG. 5.

The distillation head or fractional distillation head 100 has a vertically extending inner chamber 120. This vertically extending inner chamber 120 is, in embodiments of the disclosed technology, the longest single element of the distillation head 100 and is designated as "vertical" as this is it's typical orientation during use. For purposes of this disclosure, directions are relative to the vertical direction, as shown in FIG. 1, for example. This vertical and largest chamber 120 of embodiments of the disclosed technology has a top portal 129, a bottom portal 109, and a side portal 139. The top and bottom portals are opposite to each other and a secondary bottom portal 119 is at a point where the inner chamber increases in horizontal cross-sectional area. A discharge chamber 130 is where vapors re-condense and exit, after passing through the side portal 139 and then through the discharge chamber itself.

Raschig rings or packing 10 is placed within the chamber 120 supported by a pinched region 112. The pinched region 112 is, in some embodiments of the disclosed technology, formed simultaneous to, and is an integral part of a piece of glass which makes up the entirety of the distillation chamber 100 or at least the walls of the inner vertical chamber 120. Thus, the vertical inner chamber 120 is defined by side walls extending between the top portal 129 and bottom portal 109. Parts of the vertical inner chamber 120 are surrounded, in embodiments of the disclosed technology, by an airtight jacket 124, in embodiments of the disclosed technology, which shares a side wall with the inner vertical chamber where the jacket surrounds the inner vertical chamber. Further, a second airtight jacket 126 surrounds the inner jacket 124 making a double layered jacket. The outer walls of the outer jacket 126, in embodiments of the disclosed technology, are also the outer walls of a portion of the vertical section of the head 100 which the outer jacket 126 encloses. The jacket 124 and 126 extend substantially or fully the same distance from top to bottom of the head 100 and can share airspace by way of a portal 126 cut into the shared wall between the two jackets. The portal 126 can be a circle shaped portal, the circle being oriented vertically. As such, stress on one of the jackets which causes higher pressure there-in is split more evenly through both jackets 124 and 126 as air can move from one to the other to equalize pressure between the jackets.

The packing material or Raschig rings 10 are supported by the pinched region 112 and held-there above due to either their larger size such that they cannot fit through the pinched region in one or all dimensions (e.g. orientations of the packing material) or due to their abutment against each other. The Raschig rings are packing material 10 is added through the more narrow region of the head 100 (between the pinched region 112 and portal 119, where the vertical section 120 becomes wider) and in some embodiments, at least partially into the wider region of the vertical section 120.

In some embodiments, a key 200 is inserted through the top portal 129 of the vertical chamber 120. The key can seal the portal 200, or substantially seal the portal 200 and extends downwards into the inner region of the vertical chamber 120. This key can have one or more rings 210 which are spaced apart from each other and promote condensation of vapors which rise vertically to the level of the rings/key. The rings 210 can be below the side portal 139 in embodiments of the disclosed technology. Still further, they key can be equi-spaced from the side walls of one or more of the jacket 122, jacket 124, and/or inner inner section 120 of the head 100. This makes the key centered with respect to the vertical section of the distillation head 100.

Note also that there is an unencumbered region 135 within the hollow interior vertically oriented space 120 of the head 100. This unencumbered region has air and/or the vapors/material being distilled as the material passes from the load flask chamber/bottom portal 109 out through the distillate/side portal 139. This unencumbered region 135 can be defined or vary in a few ways. It can be at a mid-region (encompassing or crossing at least a 40% to 60% space between top and bottom of the device), or be above the Rashig rings/packing and below the key 200 and it's rings 210. Further, it can be below the side portal 139 and above the narrow region and the portal 119 entering thereto. This region is where the vapors can move upwards freely, with the cooler vapors or those with a higher boiling point than the temperature of the unencumbered region 135 and region with the packing material 10, condensing and remaining therein. On the opposite side, vapors within the Raschig rings 10 can move up freely due to the lack of temperature gradient between the narrow region 112 and top of the Raschig rings as well as the unencumbered region. This results in a very even temperatured distillation process.

Referring now to FIG. 4 in specific, one can see the method of preparing the head 100 for use. The packing material or Raschig rings 10 are placed through the top portal 129 of the distillation head 100 where they are supported by the pinched section 112. Note that while the drawing shows the rings in one mass, they can be unattached to one another and separate until placed into the chamber. Each ring can have an inner portal 5 which passes therethrough. This allows heat/vapors to pass through without rattling or moving the rings. After adding the Raschig rings 10, one can then insert the key 200 if desired. Then, fractional distillation, as described above, takes place with a constant temperature and more pure distillate products while requiring less re-distillation.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

I claim:

1. A distillation head, comprising:
   a vertically extending inner chamber extending between a lower portal and an upper portal with a pinched inner region in a lower section of said inner chamber;
   a plurality of Raschig rings above, and supported by, said pinched inner region of said vertically extending inner chamber;
   a hollow portion of said vertically extending inner chamber between said Raschig rings and a side portal, said side portal connecting said hollow portion of said vertically extending inner chamber with a hollow portion of a discharge chamber;
   said upper portal being centered with respect to said side walls and sealed by way of a distillation key which extends into said inner chamber which is entirely centered with respect to said side walls.

2. The distillation head of claim 1, further comprising:
   a distillation key extending within a single said upper portal of said vertically extending inner chamber towards said Raschig rings which is equi-spaced from side walls of said vertically extending inner chamber, said side walls being walls extending between said upper portal and said lower portal of said vertically extending inner chamber.

3. The distillation head of claim 2, wherein a portion of said vertically extending inner chamber unencumbered by either said distillation key and said Raschig rings is heated by a heat source below said bottom portal and is of substantially equal temperature to said Raschig rings.

4. The distillation head of claim 2, wherein a portion of said vertically extending inner chamber unencumbered by either said distillation key and said Raschig rings comprises less than 20% of a vertical distance of said vertically extending inner chamber.

5. The distillation head of claim 1, wherein said vertically extending inner chamber is at least mostly surrounded by an air-tight enclosed jacket having two spaced apart layers and shared airspace with a portal extending between and opening into said two layers which is transverse to said vertically extending inner chamber.

6. The distillation head of claim 1, wherein said vertically extending inner chamber and said pinched inner region are formed together as one continuous and uninterrupted unit of inert glass material;
   a continuous and uninterrupted vertical region extends from below said pinched region, through said pinched region, and above said pinched region, said uninterrupted vertical region passing through said pinched region being more narrow than any of said plurality of Raschig rings;
   and said pinched region has rounded inner side walls.

7. A method of using the distillation head of claim 3, comprising:
   placing said plurality of Raschig rings through said upper portal before melting a solid such that it's vapors extend upwards from said bottom portal, between said Raschig rings, and at least partially out of said side portal.

8. The method of using the distillation head of claim 7, wherein said vapors, when between said bottom portal and said unencumbered portion of said vertically extending chamber are of substantially the same temperature, said same temperature being elevated at least 50 degrees Celsius over ambient air temperature.

9. The distillation head of claim 1, wherein said distillation key has a plurality of spaced apart rings positioned below said side portal which extend horizontally from a solid body of said distillation key.

10. A fractional distillation device comprising:
    an unencumbered mid-region of a vertical chamber;
    a plurality of Raschig rings extending from said unencumbered mid-region to a narrowest section of said vertical chamber;
    a centered top portal adapted for passage there-through of said pluraly of Raschig rings and wider than said narrowest section;
    wherein said vertical chamber comprises a bottom portal below said narrowest region, a top portal on a side opposite said bottom portal, and side portal opening into said vertical chamber above said unencumbered region.

11. The fractional distillation device of claim 10, further comprising an upper region having a horizontally centered key extending downwards from said top portal of said vertical chamber, said upper region being defined as between said top portal and a lowest extent of said key.

12. The fractional distillation device of claim 10, further comprising a double layered airtight jacket around at least a majority of said upper region and said unencumbered mid-region of said vertical chamber.

13. The fractional distillation device of claim 12, further comprising a portal between each layer of said double layered airtight jacket.

14. The fractional distillation device of claim 12, calibrated such that heated vapors which extend from beneath said device into said vertical chamber through said bottom portal and at least partially out of said side portal cause a constant temperature or substantially constant temperature to be reached, over time, between said bottom portal and said unencumbered mid-region.

15. The fractional distillation device of claim 14, wherein said substantially constant temperature is further in an entirety of said unencumbered region.

16. A method of fractional distillation of matter which comprises solids at room temperature, comprising the steps of:
    placing Raschig rings through an upper portal in a vertical chamber of a fractional distillation device, said vertical chamber having a portion thereof uninterrupted by solid material between a bottom most extent of said device, said vertical chamber being narrowed at sides thereof;
    continuing to place said Raschig rings into said vertical chamber until said Raschig rings reach at least a height of an airtight jacket;
    heating a solid beneath said vertical chamber causing at least some vapors from said solid to pass, without prior blockage, directly through and above said Raschig rings and exit through a side portal of said vertical chamber, said side portal being above said Raschig rings;
    wherein a temperature of said vapors passing through said Raschig rings as well as between said Raschig rings and said side portals are of substantially the same temperature throughout a majority of said fractional distillation.

17. The method of fractional distillation of claim 16, wherein said airtight jacket is double layered.

18. The method of fractional distillation of claim 17, wherein a portal extends between each layer of said double layered said airtight jacket.

19. The method of fractional distillation of claim 16, further comprising, before said step of heating, placing a distillation key into an upper portal of said vertical chamber such that said distillation key extends a majority of a distance between said upper portal and an upper extent of said Raschig rings.

20. The method of fractional distillation of claim 19, where said same temperature extends to a bottom most extent of said distillation key.

* * * * *